Figure 1:
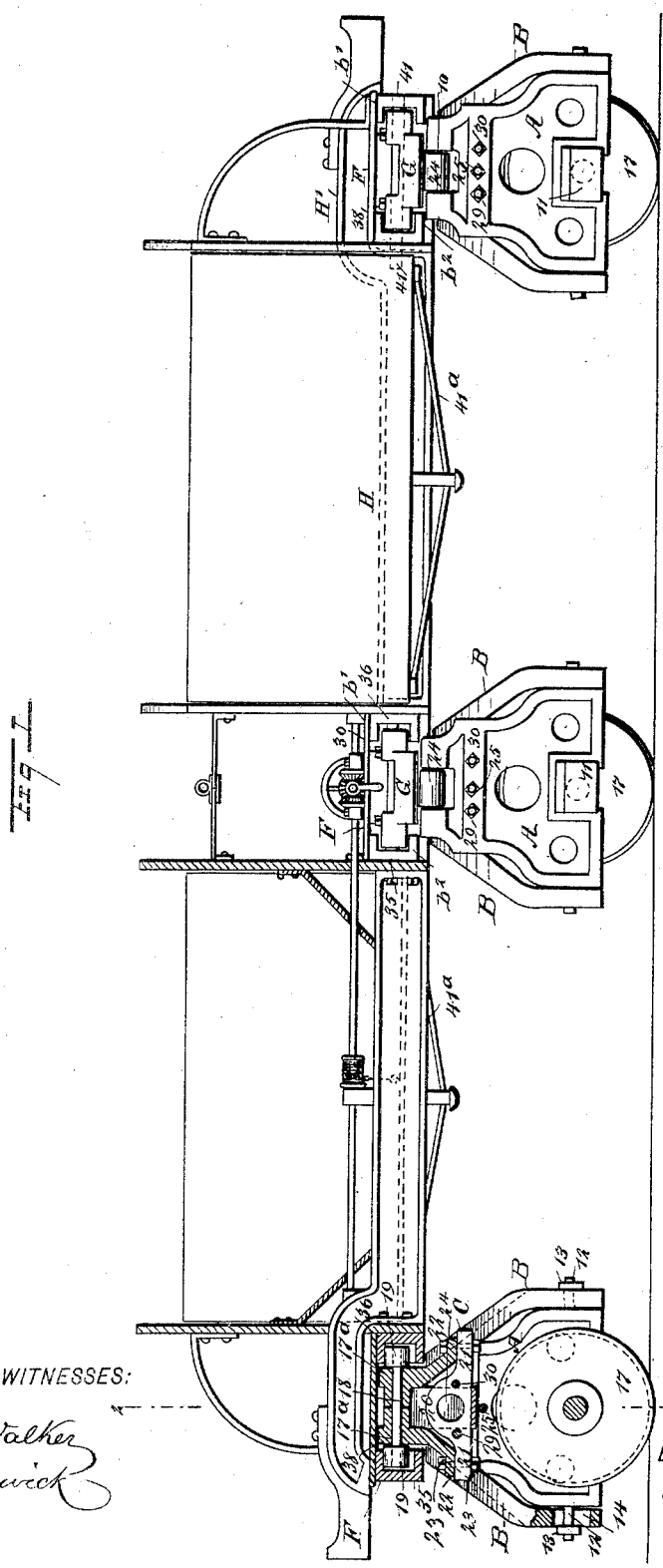

(No Model.) 3 Sheets—Sheet 1.

G. F. FISCHER.
CAR TRUCK.

No. 503,412. Patented Aug. 15, 1893.

WITNESSES:
H. Walker
E. Sedgwick

INVENTOR
G. F. Fischer
BY Munn & Co
ATTORNEYS.

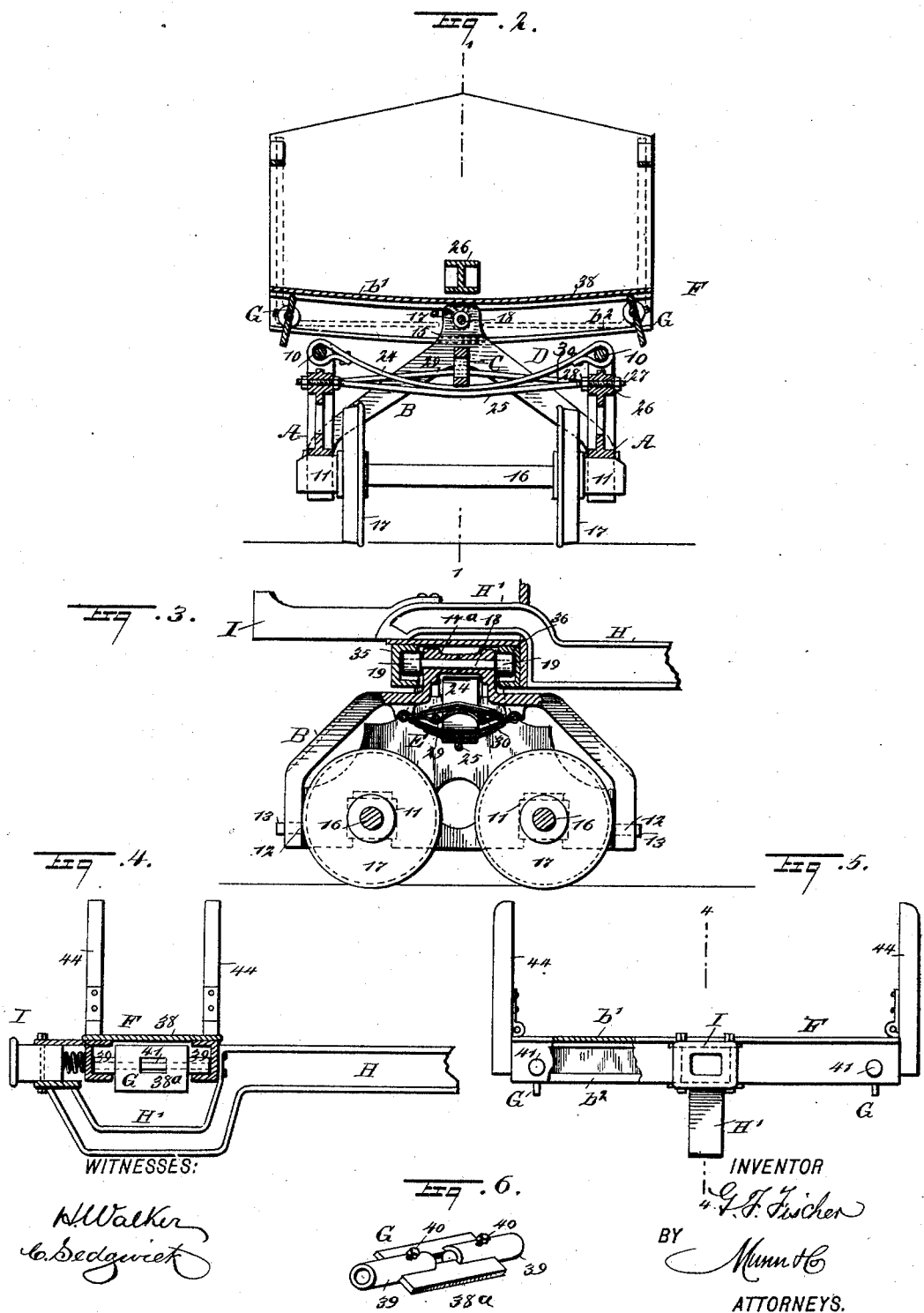

(No Model.)  3 Sheets—Sheet 3.
G. F. FISCHER.
CAR TRUCK.
No. 503,412.  Patented Aug. 15, 1893.
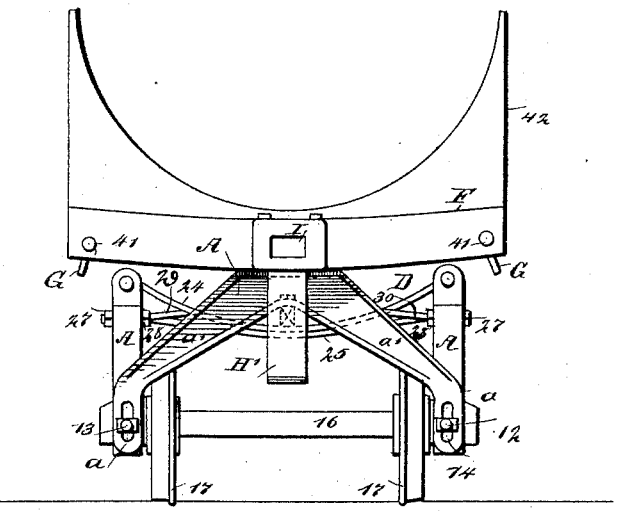
WITNESSES:
H. Walker
C. Sedgwick
INVENTOR
G. F. Fischer
BY
Munn & Co
ATTORNEYS.

UNITED STATES PATENT OFFICE.

GEORGE FRANCIS FISCHER, OF ROCHESTER, NEW YORK.

CAR-TRUCK.

SPECIFICATION forming part of Letters Patent No. 503,412, dated August 15, 1893.

Application filed March 2, 1893. Serial No. 464,368. (No model.)

*To all whom it may concern:*

Be it known that I, GEORGE FRANCIS FISCHER, of Rochester, in the county of Monroe and State of New York, have invented a new and useful Improvement in Car-Trucks, of which the following is a full, clear, and exact description.

My invention relates to an improvement in car trucks, and it has for its object to construct a truck either single or double, capable of supporting any car body, and capable of being used in pairs or in any desired number in connection with a car body, and further capable of use as a support, without a floor, for a tank body, or used without a floor as a flat or logging car.

It is a further object of the invention to provide a means for coupling a series of trucks together, which coupling may be omitted or used in connection with the trucks as occasion may demand.

It is a further object of the invention to provide trucks so constructed that they will automatically return to the center of the body which they may support when passing from a curved to a straight line of track, or whereby the body or object supported by the truck will at that time be carried over the center of the truck.

It is another object of the invention to construct the truck in such manner that it may be carried with perfect safety and with rapidity over quite short curves.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of a series of trucks, one of them being in vertical section, the trucks being illustrated as supporting a dumping coal car, the section being taken essentially on the line 1—1 of Fig. 2. Fig. 2 is a vertical section taken practically on the line 2—2 of Fig. 1. Fig. 3 is a central vertical section through a four-wheeled car truck, the trucks shown in the other views being two-wheeled trucks, the said figure also illustrating a modification in the construction of the truck. Fig. 4 is a vertical longitudinal section, taken practically on the line 4—4 of Fig. 5 and illustrating the outer end of the truck coupling and a sectional view of the platform of the truck, showing the adaptation of the truck as a portion of a logging car, and Fig. 5 is a side elevation of the parts shown Fig. 4, a portion of the platform being broken away. Fig. 6 is a detail perspective view of a gate employed in connection with the platform. Fig. 7 is a front elevation of a two-wheeled truck, illustrating the platform of the truck as constructed to support a tank or like object. Fig. 8 is a front elevation of a modified form of the platform slide-way in which the truck moves. Fig. 9 is a partial side elevation of a truck coupling and a vertical section through a platform constructed as shown in Fig. 7; and Fig. 10 is a detail view of a modification in the spring truss.

In carrying out the invention the standards or pedestals A, may be given any desired form. Preferably, however, they are made practically solid, and at the upper end, which is of less width than the base, an anchorage bar 10, is formed; and in the lower end of the pedestal, if but two wheels are to be used in the construction of the truck, a single box 11, is located in each standard; but when four wheels are to be employed in connection with the truck two boxes 11 are employed in connection with each standard, as shown in Fig. 3. Each standard is provided at each side near its base, with a stud 12, shown in dotted lines in Fig. 3, and each stud is provided with a head 13 in the shape of a button, the said head or button being preferably placed transversely of the standard, as shown in Figs. 1 and 7.

In addition to the standards each truck is provided with two saddles B; the saddles are differently shaped, but practically they approximate an inverted letter V in general contour. When two wheels are used upon a truck the saddles very closely approximate the shape of an inverted letter V, as shown in Figs. 2 and 7; but the lower ends of the saddles are carried vertically downward, as shown at *a* in Fig. 7, and the said vertical extremities of the saddles have produced therein vertical slots 14 of any desired length. The saddles in front elevation incline inward from the point where the vertical extremities $a$ join the body, as shown in Figs. 1 and 3; thus their upper ends are considerably within the plane of their lower extremities.

Each saddle is provided at its upper or contracted end with a head 15, as shown in Fig. 2, and this head may be given any shape that in practice may be found most desirable. As has heretofore been stated, when the truck is to be a two-wheeled truck, the saddles very closely approximate an inverted letter V; but the shape of the saddles may be varied in a manner enabling them to be used in connection with standards A in which four or more wheels are journaled. But in practice each saddle may be said to consist of the lower perpendicular members $a$ heretofore referred to, intermediate inclined members $a'$, and the head 15, the head being perpendicular or vertical. The saddles are attached to the standards, and in the construction of each truck two standards and two saddles are employed, the standards constituting the sides of the truck and the saddles the front and rear.

The connection is brought about between the saddles and the standards in the following manner: The standards are carried to a horizontal position and their buttons 13, are introduced into the slots 14 of the saddles; after the buttons of the standards have been passed through the slots in the saddles, the standards are carried to a vertical position, which will cause the buttons 13 to extend transversely over the slots 14 in the saddles and beyond the side walls of said slots, as shown best in Fig. 7. The axles 16 of the wheels 17, are journaled in the usual or in any approved manner in the boxes 11, carried by the standards. Each saddle is provided with a sleeve or hub $17^a$, formed integral with the inner face of its head, and when the saddles are in proper position the sleeves of each two saddles meet, as shown in Fig. 3, and a bolt or pin 18, is passed through the central portion of the two heads of the saddle and through their sleeves $17^a$, as shown in Figs. 1 and 3, and the said pin extends beyond the outer faces of the heads of the saddles, and has mounted upon its extremities friction rollers 19. The pins 18, are not utilized as connections for the saddles; in fact, the pins are supported by the saddles, and the opposing saddles of the truck are held in proper relation to each other through the medium of a bracket C. The bracket may be of any approved construction; but ordinarily it comprises a body 20, as shown in Fig. 1, the body being flat upon its lower edge and cylindrical upon its upper edge; but the upper portion of the body of the bracket may be polygonal or rectangular according to the formation of the saddles.

In addition to the body 20, each bracket is provided with horizontal arms 21, which extend from opposite lower sides of the body, as is likewise shown in Fig. 1; and the said arms are connected with lips 22, or the equivalents thereof, formed upon the central portion of each saddle immediately below its head, the lips being preferably integral with the inner or under edge, and the connection between a bracket and two opposing saddles is made preferably by passing bolts 23, through the arms of the bracket and through the lips 22 of the saddles, as is also shown in Fig. 1. Through the medium of the brackets a positive and firm connection is effected between the opposing saddles of a truck, and the saddles are firmly bound in place, the sleeves and their heads coming in engagement. The pin 18, passed through the heads of the saddles is relieved from all strain except that which is brought to bear upon its extremities, by reason of the friction rollers 19, engaging with bearings to be hereinafter described.

In addition to the brackets, the saddles and the standards, each truck is provided with a spring truss D; this truss is adapted to connect the standards or hangers of a truck, and likewise is adapted to engage with the bracket C; and the spring truss also serves as a cushion for the car body or other object that is to be supported by a truck or trucks.

The formation of the spring truss D, is best shown in Figs. 2 and 7, and consists preferably of a downwardly inclined spring plate or member 24, which spring plate or member is passed around the anchorage bars 10 of the standards, as shown in Fig. 2, the ends of the spring member being formed with loops for that purpose. The spring member 24 of the truss passes beneath the bracket C, and engages with the lower central portion thereof; and in addition to the spring member 24 a rod 25, is employed to support the lower portion of the bracket, and this rod passes beneath and in engagement with the central under surface of the spring member 24 of the truss; and the ends of the supporting rod 25, are threaded and passed through apertures 26, formed in the standards A, the apertures being made straight or flaring as in practice may be found most desirable, but preferably flaring; and at each end of the supporting rod 25 of the truss two nuts 27 and 28, are located, the inner nut being a check nut, and it engages with the inner face of the standard, while the outer nut 27, is a lock nut and engages with the outer face of the standard as shown in both Figs. 2 and 7. The supporting rod or member 25 of the truss is curved in a slight degree in the same direction as the spring plate or member 24; and the formation of the truss is completed by the addition of two upwardly-curved rods 29 and 30. These rods are likewise threaded at their ends, and are passed through apertures in the standards, one at each side of the central or supporting rod 25. The upper rods 29 and 30, are bowed upward, and are passed through openings made in the bracket C, as shown in Fig. 2. Thus the spring truss preferably consists of a downwardly bowed spring plate and supporting rod and two upwardly oppositely bowed supporting rods, the upper supporting rods passing downward at their ends, one at each side of the spring member 24.

Owing to the contrary manner in which the members of the spring truss are arched, passing respectively through and beneath the bracket, the bracket is prevented from dropping out of position, rendering the use of a multiplicity of bolts or screws as fastening devices for the bracket entirely unnecessary. The arms on the outer ends of the brackets prevent the saddles from parting, and the saddles prevent the bracket of a truck from moving in any direction. By tightening or screwing the nuts on the round or rod members of the spring truss close to the sides of the standards, increased resistance to the spring member is obtained, thereby restricting and confining the vibration of the round or rod members within certain limits. This limit of resistance of the round or rod members of the truss may be increased in the same ratio that the nuts thereon are unscrewed or carried away from the sides of the standards until the full sweep of all the members of the truss is reached, the sweep or limit being defined by the degree to which the holes in the standards through which the rods or round members of the truss pass are flared. The spring member, which is ordinarily made in one piece, may be in any number of parts graduated in length, as for example it may be practically a leaf spring.

When considerable spring action is required between the car and the truck, the bracket shown in Figs. 1 and 2 may be substituted by the bracket shown in Fig. 3, the bracket being designated by the reference letter E. This substitute bracket is constructed substantially in the shape of an elliptical spring, the ends of the spring being secured by bolts or otherwise to the saddles of the truck, and the inner upper leaf of the spring is curved downward at each side of the center in such manner as to form recesses or depressions through which the upper bars or round members of the truss may pass, while the spring member of the truss engages with the lower surface of the spring, and the lower rod or round member of the truss engages, as has been heretofore described, with the spring member. This form of bracket is particularly used when the truck is adapted to carry four wheels.

In connection with each bracket a platform F, is employed. This platform preferably consists of two parallel bars 35 and 36, as shown in Fig. 9 and likewise in Figs. 2 and 8. The parallel bars 35 and 36, ordinarily consist of an upright member $b$, and an upper and lower inwardly-extending member, designated respectively as $b'$ and $b^2$, whereby the bars are somewhat U-shaped in cross section; and the upper and lower flanges $b'$ and $b^2$, constitute bearings or rolling surfaces for the friction rollers 19, which are intended to extend within the bars. The friction rollers 19, engage with the upper flanges $b'$, as shown in Figs. 1 and 3, and preferably the inner faces of the upper flanges $b'$ of the parallel bars of the platform are curved, the convexed face of the flanges being the under face, and the lower flanges $b^2$ are correspondingly curved, their upper faces being concaved as is most plainly shown in Fig. 2. Thus it will be observed that after passing a curve, whatever object is supported by the trucks will center itself thereon automatically, as the friction rollers will always seek to find the lowest point in the ways in which they travel.

In Fig. 8 a modification in the construction of the parallel ways or bars of the platform is shown, in which the upper and lower flanges are straight, and the curved slide ways or run ways in which the friction rollers 19 are to travel are formed by attaching to the body of the bars or to their flanges, concentrically-carved auxiliary bars 37. The formation of the platform F is completed by connecting the side or parallel bars by a suitable plate 38, which is riveted or otherwise secured to the bars.

In order that the spring device or truss may be properly understood I will at this time describe its operation and likewise the operation of the devices connected with it, namely, the saddles, brackets, &c. The saddles are supported directly by the cushion or spring device through the intervention of the brackets. It therefore follows that the saddles must of necessity work up and down with the action of the spring; to enable the saddles to accomplish this, the slots in the saddles, through which the heads of the buttons on the standards pass, must be of such length as not to interfere with the action of the spring; as the entire load of the car in addition to the saddles is supported by the spring device, the central portion of the spring will in consequence be carried or forced downward considerably and made to vibrate in a larger space, or to a greater degree than their lower ends. Consequently, the slots in the saddle must be of the same length, or of sufficient length to correspond to the greater vibration of the spring, and the flared holes in the standards correspond to the lesser vibrations of the said spring device, and both the larger or smaller, or the longer and shorter vibrations of the spring are produced simultaneously; both the limit of the flared holes and the limit of the slots in the saddle are reached at one and the same time, but by manipulating the nuts on the round or rod members of the spring device, as has heretofore been described, the vibrations thereof may be confined or restricted within any degree allowed or set by the limit of such flared apertures in the standards and the limit of such slots in the saddles.

It will be understood, in connection with the foregoing, that the saddles and the entire weight of the car, through the interposition of the brackets are to be supported by the spring device, and owing to the fact that said spring device is capable of adjustment and manipulation, permits the said saddles and the weight of the car to be transferred or shifted gradually from off the spring device onto the standards of the truck. To accomplish this, it is necessary that the lock nuts should be carried clear to the ends of the rods and the check nuts also be carried inward on the rods as far as necessary. At that time, it will be seen, the distance between the under edges of the platforms and the tops of the standards, correspond or nearly so to the working length of the slots in the saddles; therefore by the time the under parts or edges of the platforms which support the car body or bodies, are brought in engagement with the recesses on the upper parts of the standards, the saddles come in engagement with and rest on the buttons on either side thereof, the pressure brought to bear by the saddles on the buttons being just sufficient to perfectly balance the truck on the wheels of the axle. Thus it will be seen that an extraordinarily heavy load may be shifted from off the spring device to that portion or part of the truck well able to support it. The advantages of such a spring device in connection with a saddle and a truck of such construction, will be briefly set forth as follows: First, that the truck is capable of being perfectly balanced; second, that the spring is capable of being adjusted to such an extent that it will support an empty car body with the same degree of vibration or spring action as it will a loaded car body; third, the spring device is capable of shifting, transferring the weight from the spring proper to the truck, or from the truck to the spring, thereby relieving all the parts from undue and unnecessary strain. It will be understood that the shifting of the weight from the truck to the spring, or vice versa, need take place only when it is desired to save the spring from the strain to which it would necessarily be subjected in carrying heavy freight, such as heavy ordnance, pig iron, &c.

It will be understood that one of the main objects of this invention is to employ but three single axle trucks in connection with one extraordinarily long car body, or two ordinary car bodies or tanks, as these single axle trucks when used in connection with a long car, will carry the car around short curves with perfect safety. Therefore, in Fig. 1 I have illustrated a car to the body of which three single trucks are connected, the car being a dumping coal car, and one truck is located beneath each end platform while the third truck is beneath the central platform; but if in practice it is found desirable but two trucks may be employed, either single or double; or three trucks arranged in closely grouped sets of threes may likewise be employed if in practice it is found desirable, in which event a group of three trucks will be located at each end of the car and the third group at the center.

The object of employing three trucks is not only that they may be operated without a floor, nor yet for the mere fact that they will carry an exceedingly long car body, or two car bodies or tanks, but that they are enabled to run around curves with perfect safety and give that easy riding and undulating motion to cars, and entirely prevent the see-saw, bobbing and jumping motion so common with all single axle trucks of the ordinary construction.

It will be understood that since the movement of the truck is wholly governed by the rails, and the movement of the platforms is governed in the same ratio by the trucks, and the platforms being independent of the trucks in-so-far-as they are not secured thereto, it therefore follows that some means should be devised to prevent the platforms and any object located thereon from being thrown from the trucks; and it is also desirable to so brace each platform as to prevent it from being stove in when brought violently in contact with a platform of an opposing car. This is accomplished through the medium of gates G, one of which is shown in detail in Fig. 6. These gates comprise a central rectangular blade or body $38^a$ and sleeves 39, located at the ends of the body, a space or slot being produced in the body or blade $38^a$, between the inner opposing ends of the sleeve; and each sleeve is provided with a set screw 40 or the equivalent thereof.

A single pintle 41, shown in Fig. 1, or two pintles may be employed in connection with each gate. If a single pintle is employed it is passed through both of the sleeves and extends beyond the outer ends thereof, being held in connection with the sleeve through the medium of the set screws 40; and if two pintles are employed, one is placed within each sleeve. A gate is placed at the end of each platform, and the pintles thereof are journaled in the parallel or front and rear bars of the platform, as is particularly shown in Fig. 1. These gates effectually serve to limit the outward movement of the car body, and as they are located transversely of the platform it is braced and strengthened against any shock that the platform may be called upon to encounter. When it is desired to remove the platform from the truck for the purposes of repair, for example, or to place the truck upon different styles of body, one or both of the gates may be readily removed by loosening the set screws 40 and forcing the pintles out from the platform.

Instead of using pintles for each gate, when truss bars $41^a$, are employed as stays for the bottom of the car body, the ends of the truss bars may be carried through the sleeves of the gate and consequently through the platform, in which event by removing the trusses the gates may be removed from the platforms.

As has heretofore been stated any style of body may be supported by the trucks described, as for example, as shown in Figs. 7 and 9, if the trucks are intended to carry a cylindrical body, namely, a tank, any desired number of trucks may be assembled together, and upon the platform of each truck a support 42, may be erected, having a semi-circular upper face in which the tanks rest; and the upright portions of the semi-circular supports may be provided with apertures 43, as shown in Fig. 9, in order that the supports may be bolted to the tank. It is evident that in this event no flooring of any description will be required. Furthermore, the trucks may be assembled together to form a logging car and no flooring need be used.

In Figs. 4 and 5 the platform of a truck is illustrated as fitted for use as a portion of a logging or flat car; and when so used standards 44, are secured upon the platforms at the ends thereof, which standards may be capable of folding down upon the platform if in practice it is found desirable.

In many forms of cars it may be, and is, desirable to connect the trucks so that they will be held at given distances apart in order that their platforms need not be connected with a flooring or equivalent support. To this end one or more coupling beams H, are employed. The beams are preferably I-shaped in cross section, although they may be given a different contour; and if, for example, a car body is supported by three trucks two beams are used, the beams being secured at their inner ends by angle irons or the equivalents thereof, to the side faces of the intermediate platform, as shown in Fig. 1; and the beams extend to the platforms of the end trucks and the outer extremities of the beams may be carried upward and outward over the end platforms, as shown in Figs. 1 and 3, or they may be dropped below said platforms and then carried upward, as shown in Figs. 4, 5, 7 and 9.

The curved portions or outer extremities of the coupling beams may be called buffing arms, and the said buffing arms are designated by the reference letter H'. The drawhead I, may be attached to the buffing arms of the coupling beams, as shown in Figs. 1 and 3, or the drawhead may be supported by the outer extremity of the said buffing arms, as illustrated in Figs. 4, 5, 7 and 9.

In Fig. 10, I have illustrated a modified or simple form of spring bar or member of the truss, in which the spring bar is curved upward at its ends, and said ends are apertured to receive the truss rod carrying the lock and check nuts. This bar possesses some advantages over the loop bar, among which may be mentioned the fact that the bar may be more quickly removed, or replaced in position, than the loop bar, and does not necessitate the employment of separate parts; further, when the modified form of spring bar is employed, anchorage bars and slots in the upper parts of both standards are unnecessary, thereby enabling the truss rod which passes through the ends of the spring bar to act more in unison with it; in fact the spring bar is enabled to respond to the slightest movements or manipulation of the truss rod.

It will be observed in connection with the foregoing, that the platforms with slide ways are mounted on and supported by a traveling center bearing, off-set or support. This traveling center being carried by the truck it therefore follows that in whatever direction the truck moves the center must move in the same direction as that taken by the truck, so if the traveling center carried by the truck moves out of the center of the platform, that end of the platform which is farthest from the center of support will naturally and necessarily be carried downward, while the end of the platform nearest the said center of support will be elevated in the same ratio as its opposite end is depressed downward; and the farther this center support moves from the center of the platform the farther will the center of the platform move from the center of the platform support, and by reversing the process the nearer the center of the truck approaches the center of the platform, the nearer will the said platform be to the horizontal position, and when both the traveling center of the truck and the center of the platform meet, the truck and the platform will be in their normal or horizontal position, while at the same time that the center of the truck and platform meet, the trucks will leave the curve and run on a straight track.

It will be understood that the curvature of the slide-ways in the platforms should be sufficient to compel the return of the car body or platform to its normal position, the tendency of the curvature being essentially downward toward its center. I further desire it to be understood that the roller bearings may be substituted by bearings of any other desired shape, particularly a bearing of an essentially diamond shape.

It may be added by way of explanation that the trucks are practically non-pivoted in their nature and application, that is, a pivot or king bolt is dispensed with, but one may be employed if at any time its presence is necessary.

Having thus described my invention, I claim as new and desire to secure by Letters Patent—

1. In the construction of cars, the combination, with a plaftorm having slide-ways therein, curved upwardly at opposite sides of their middle portions of a truck provided with bearings fitted to the said slide-ways of the platform, as and for the purpose set forth.

2. In the construction of cars, the combination, with a platform having slide-ways formed therein and curved upwardly from the center thereof, of a truck provided with friction rollers, the rollers being adapted for engagement with a wall of the slide-way of the platform, substantially as shown and described, whereby the platforms will automatically center themselves upon the truck when passing from a curved to a straight line of track, as and for the purpose set forth.

3. In the construction of cars, the combination, with a platform having slide-ways therein and gates located at the ends thereof, of a truck having movable bearings, entering and sliding in the slide-ways of the platform, as and for the purpose specified.

4. In the construction of cars, the combination, with a truck provided with a centering bearing and friction rollers connected therewith, of a platform provided with slide-ways receiving the friction rollers of the truck, and gates pivoted in the end portions of the platform and crossing the slide-ways, the said gates being removably attached to the platforms, as and for the purpose set forth.

5. In the construction of cars, a truck, the same consisting of standards, saddles connected with the standards, a spring truss connecting the standards, and a bracket connecting the saddles and supported by the truss, as and for the purpose specified.

6. In the construction of cars, a truck comprising standards, saddles connected with the standards, the standards forming the sides of the truck and the saddles the front and back, a spring truss connecting the standards, an adjusting mechanism connected with the truss, and a bracket connecting the saddles, supported by and connected with the truss, as and for the purpose set forth.

7. In the construction of cars, a truck, the same consisting of standards adapted to receive the boxes of the wheel axles, saddles essentially V-shaped in general contour, having a sliding movement upon the standards and connecting the standards, the saddles being oppositely located, a bracket spacing and connecting the standards, and a truss having a spring action, connecting the standards at their upper ends and having bearing against the bracket, the truss being adjustably connected with the standards, as and for the purpose set forth.

8. In a car truck, the combination, with side standards, and saddles of approximately V-shape connecting the front and rear edges of the standards, the saddles having vertical movement upon the standards, of a bracket connecting the saddles, a spring truss comprising a spring bar attached to anchorage bars on the standards, and rods above and below the bar, the spring bar and lower rod being curved in the same direction and the upper rods oppositely curved, the rods and bars of the truss engaging with and supporting the bracket, as and for the purpose set forth.

9. In the construction of cars, the combination, with platforms and trucks having sliding movement in the platforms, of coupling beams connecting the several platforms, the said coupling beams being curved around the outer platforms, as and for the purpose set forth.

10. The combination with a transverse platform or bolster formed of parallel channel irons spaced apart and curved upwardly at their ends, of a truck having antifriction rollers traveling in the curved ways formed by the channels, substantially as set forth.

11. The combination with the transverse parallel channel irons curved upwardly from the middle of a non-pivotal truck having front and rear anti friction rollers traveling laterally and upwardly in the said channels substantially as set forth.

12. The combination with a plurality of rigidly connected platforms or bolsters each having guide ways curved upwardly at opposite sides of their middle portions, of a non-pivotal truck for each platform or bolster and provided with anti friction rollers traveling in said guideways, substantially as set forth.

13. The combination with the platforms or bolsters formed of parallel channel irons curved upwardly from the middle, of longitudinally extending beams rigidly connecting said platforms or bolsters and holding them against pivotal movement, substantially as set forth.

14. The combination with the rigidly connected platforms or bolsters all having guideways curved upwardly from the middle, of a truck for each platform consisting of standards, saddles connected with the standards, a spring truss connecting the standards and a bracket connecting the saddles and supported by the truss, substantially as set forth.

15. The combination with the rigidly connected front, rear and intermediate platforms or bolsters all having guideways curved upwardly from the middle of end and intermediate trucks having anti-friction rollers traveling in said guideways; said trucks being held against horizontal turning or pivotal action, substantially as set forth.

16. The combination with a car body or frame having transverse guideways on its under side curved upwardly at both sides of the middle, of spring trussed trucks provided with anti friction rollers or bearings traveling in said ways, substantially as set forth.

17. The combination with a platform or bolster provided with guideways curved upwardly at both sides of the middle, of a spring trussed truck having anti friction bearings traveling in said ways and adjusting rods or bolts for relieving the spring truss of the weight supported or throwing the weight thereon, substantially as set forth.

18. The bolster-connecting beams bowed or arched to cross the front and rear bolsters and adapted at their outer ends to support the drawheads, substantially as set forth.

GEORGE FRANCIS FISCHER.

Witnesses:
HENRY H. HOOCK,
FREDERICK AUBERGER.